J. S. LAPP.
METHOD OF MAKING INSULATORS.
APPLICATION FILED JAN. 2, 1914.
1,170,287. Patented Feb. 1, 1916.
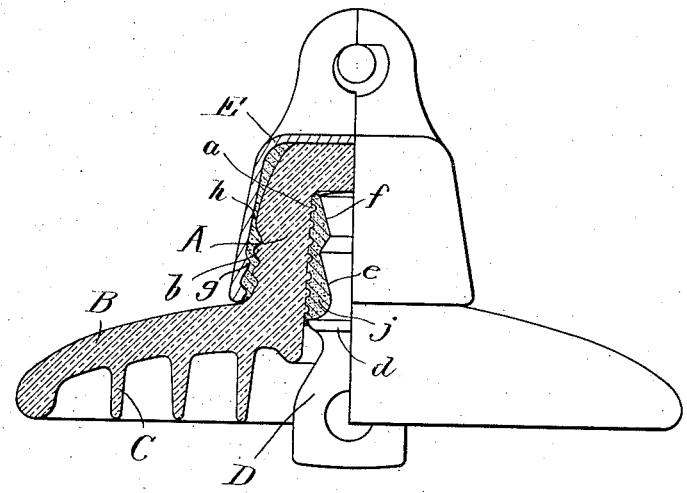
Witnesses
Walter B. Payne
Nelson H. Copp
Inventor
John S. Lapp
By Samuel Rich
his Attorneys

UNITED STATES PATENT OFFICE.

JOHN S. LAPP, OF VICTOR, NEW YORK, ASSIGNOR TO LOCKE INSULATOR MFG. CO., OF VICTOR, NEW YORK, A CORPORATION OF NEW YORK.

METHOD OF MAKING INSULATORS.

1,170,287. Specification of Letters Patent. Patented Feb. 1, 1916.

Application filed January 2, 1914. Serial No. 810,069.

*To all whom it may concern:*

Be it known that I, JOHN S. LAPP, of Victor, in the county of Ontario and State of New York, have invented certain new and useful Improvements in Methods of Making Insulators; and I do hereby declare the following to be a full, clear, and exact description of the same, reference being had to the accompanying drawings, forming a part of this specification, and to the reference-numerals marked thereon.

My present invention has for its object to provide an improved method of manufacturing insulators, particularly of the suspension type adapted to support high tension or high voltage conductors whereby the breakage that is largely due to strains and stresses set up by changes in temperatures to which insulators are subjected are very largely obviated.

In the common type of strain insulator in which a number of insulating units are connected, these units are generally composed of a central vitreous section usually of porcelain, embodying a hollow hub and a flange or apron, a metallic cap embracing the exterior of the hub and a metallic eye bolt or pin inserted in the socket of the hub, all the parts being secured in position by hydraulic cement between them. As thus constructed the cylindrical porcelain hub is interposed between the hollow metallic cap and the central pin or bolt with relatively thin layers of cement between the parts, and as the coefficient of expansion of the pin, usually composed of drop forged open hearth steel, is practically double that of the porcelain, the changes in temperature to which the insulators are subjected in use, frequently causes the expansion of the metal elements to crack the porcelain or the vitreous element. Particularly is this cracking liable to happen if the porcelain or other vitreous material is improperly treated during its baking in the kiln, as under some circumstances the particles of the porcelain are under tension, so that a slight chip or crack will cause them to fly to pieces very readily, somewhat after the manner of the well known "Prince Rupert drops". As insulators in use are, in many instances, subjected to extreme variations in temperature, from say 30 degrees below zero Fah. in winter to 115 to 120 degrees Fah. in midsummer, the liability of breakage due to variations in temperature, causing contraction and expansion, is very great. Even if both parts of the insulator are composed of porcelain or other vitreous material united by cement they are liable to become broken or the cement joint impaired by unequal expansion and contraction.

After considerable experimenting I have discovered that, if the hydraulic cement securing the parts is allowed to set when the parts are subjected to a temperature approximating the high temperature which they are liable to encounter in use, and preferably in a moist atmosphere, the breakage of the porcelain and impairment of the cement joint due to changes in temperature in use, is materially reduced, and particularly is this true when the parts are of metal and vitreous material. My invention therefore consists generally in the process or method of allowing the cement between the parts to set while said parts and the cement are subjected to a heated and preferably a moist atmosphere approximating the maximum temperature the insulators are liable to encounter in practical use.

In the drawing: The figure is a sectional view of one section of a strain insulator to the manufacture of which my invention is particularly adapted.

In the form shown the porcelain or vitreous section of the insulator embodies a hub portion A and the flange B, the latter preferably provided on its underside with the annular ribs C. The interior of the hub A is corrugated or roughened as at $a$ and the exterior is provided with the annular ribs $b$.

D indicates the pin or eye bolt extending within the hub, preferably formed of a steel drop forging, having the annular flange $d$ about 3/64 of an inch smaller than the diameter of the recess in the hub, and above this an inclined shoulder $e$ extending at about an angle of 18 degrees from the vertical. Located above this shoulder is another annular flange $f$ having its lower side extending at about the same angle, and reduced at its lower edge to a less diameter than the top of the shoulder $e$.

E represents the malleable iron cap adapted to receive the exterior of the hub A and of a slightly greater diameter internally than the latter, the inside of this cap being provided with annular ribs $g$ between which and the exterior of the hub is located a filling of hydraulic cement $h$. A filling of cement $j$ is also arranged between the interior of the hub and the exterior of the pin or eye bolt D.

The preferred manner of uniting the insulator sections is as follows: The vitreous or porcelain section is inverted and the hub extending downwardly and within the hub is placed a quantity of hydraulic cement preferably neat Portland cement, mixed with about 30 per cent. by weight of water. The eye bolt or pin is then inserted so that its end is substantially in contact with the lower portion of the recess in the hub, and it is centered and held for a few moments to prevent tilting, and then the porcelain and pin are placed in a closet or receptacle which is filled with moist steam at a temperature above that of the atmosphere, and maintained at approximately this temperature for a number of hours sufficient for the thorough setting of the cement. In a short time after being placed in the closet or receptacle, the pin and porcelain reach the temperature of the steam, and have attained their maximum degree of expansion and while in this condition the cement is allowed to set. By subjecting the parts and cement to the action of the heated moist atmosphere, and also to the action of such steam as may have been condensed, for a considerable period, the cement sets more thoroughly while the parts are expanded than would be the case if subjected to dry heat, and there is practically no tendency for the cement to crumble. The temperature of the steam determines to some extent the time required for proper treatment of the parts as, if the temperature is relatively low, say from 115 to 120 degrees Fahrenheit, the parts should remain in treatment for from forty-eight to sixty hours, while at higher temperatures, say 180 degrees, the same results would be accomplished in from thirty to thirty-six hours, but a temperature very much higher than this would render the cement brittle. From this it will be seen that the temperature is more or less a direct measure of the rapidity of the setting of the cement but no exact data can be given as the character of the cement and other conditions may vary, but the best results are attained between 115 to 180 degrees at periods varying from thirty to sixty hours. After the cement has thoroughly set, the porcelain sections containing the pins are removed from the receptacle, the iron caps are partly filled with cement of substantially the same consistency as before, and the hubs placed in them. The section is then returned to the steam closet and this cement allowed to set under substantially the same conditions as before, and after the required period it is removed and allowed to cool gradually. Even though the temperature of the atmosphere in which the insulators are used may not be greater than 115 degrees Fahrenheit, still as a matter of fact the temperature of the insulator itself when exposed to the direct rays of the sun will be considerably higher than this, but the expansion of the parts at higher temperatures is relatively slight, so that the range between 115 and 180 degrees is sufficient to expand the parts during the setting of the cement, and at the same time supply sufficient moisture to obtain the best results.

In addition to the advantages gained by allowing hydraulic cement to set in a moist atmosphere at a relatively high temperature this method also provides a means of detecting any imperfections in the galvanized coating that is usually applied to the pins and the caps, to protect them from corrosion, for after subjection to the hot, moist atmosphere any rust spots due to imperfections in the galvanized coating may be readily detected, when the insulators are removed, and if the imperfection cannot be corrected the insulator may be rejected as unsuitable.

While the invention is particularly adapted for the manufacture of insulators in which the parts are united by hydraulic cement, some of the advantages are obtained when other cements are employed which become hard at a temperature below their melting point and even with these the feature of holding the parts at a relatively high temperature so that they are expanded before the cement hardens, prevents damage to the insulators under normal working conditions.

I claim as my invention:

1. The method of uniting the parts of insulators consisting in placing hydraulic cement between the parts and maintaining the parts at a relatively high temperature until the cement has set.

2. The method of uniting the parts of insulators consisting in placing liquid hydraulic cement between the parts and subjecting them and the cement to moisture and a relatively high temperature until the cement has set.

3. The method of uniting the parts of insulators composed of metallic and vitreous sections with cement between them, consisting in expanding and holding the parts expanded by the application of heat while the cement connecting them is setting.

4. The method of uniting the parts of insulators composed of metallic and vitreous sections consisting in placing cement between the parts and maintaining them at a relatively high temperature while the cement is setting.

5. The method of uniting the parts of insulators composed of metallic and vitreous sections, consisting in placing liquid hydraulic cement between the parts and subjecting them and the cement to heat and moisture until the cement has set.

6. The method of uniting the parts of insulators composed of metallic and vitreous sections one surrounding the other, consisting in placing liquid hydraulic cement between the parts and subjecting them and the cement to the action of moist steam until the cement has set.

7. The method of uniting the parts of insulators composed of sections having different coefficients of expansion one surrounding the other, which consists in placing liquid hydraulic cement between the sections and subjecting the parts to a relatively high temperature until the cement has set.

8. The method of making insulators composed of separate sections having different coefficients of expansion one surrounding the other, consisting in placing liquid hydraulic cement between the parts and subjecting the parts and the cement to moisture and to a relatively high temperature until the cement has set.

9. The method of making insulators composed of separate sections having different coefficients of expansion one surrounding the other, consisting in placing liquid hydraulic cement between the parts and subjecting them to steam at a relatively high temperature until the cement has set.

10. The method of making insulators embodying a metallic cap and a vitreous section having a hub entering the cap, consisting in placing liquid hydraulic cement between the interior of the cap and the exterior of the hub and subjecting the parts and the cement to the action of moist steam until the cement has set.

11. The method of making insulators embodying a metallic cap, a vitreous section having a hollow hub entering the cap and a metallic pin extending into the hub, consisting in placing liquid hydraulic cement between the pin and the interior of the hub, subjecting the parts and cement to moist steam until the cement sets, then placing liquid hydraulic cement between the cap and the exterior of the hub and subjecting the parts and cement to the action of moist steam until the cement sets.

JOHN S. LAPP.

Witnesses:
R. V. BALDWIN,
K. M. RILEY.